United States Patent [19]

Sheridan

[11] Patent Number: 4,843,619

[45] Date of Patent: Jun. 27, 1989

[54] APPARATUS FOR MEASURING THE PEAK VOLTAGE APPLIED TO A RADIATION SOURCE

[75] Inventor: Terrence E. Sheridan, North Bloomfield, Ohio

[73] Assignee: Keithley Instruments Inc., Solon, Ohio

[21] Appl. No.: 185,138

[22] Filed: Apr. 22, 1988

[51] Int. Cl.$^4$ .............. G01D 18/00

[52] U.S. Cl. .............. 378/207; 378/98

[58] Field of Search .............. 378/207, 98

[56] References Cited

U.S. PATENT DOCUMENTS

| | | | |
|---|---|---|---|
| 3,515,873 | 6/1970 | Heggens | 378/207 |
| 4,189,645 | 2/1980 | Chaney | 378/207 |
| 4,361,900 | 11/1982 | Siedband | 378/207 |
| 4,392,240 | 7/1983 | Tremblay et al. | 378/207 |
| 4,697,280 | 9/1987 | Zarnstorff et al. | 378/207 |

*Primary Examiner*—Craig E. Church

*Attorney, Agent, or Firm*—Tarolli, Sundheim & Covell

[57] ABSTRACT

Apparatus is provided for use in detecting the peak voltage applied to a radiation source operating at an unknown input voltage. The apparatus includes a set of radiation absorbing filters including a first filter which includes a first element that exhibits a known K-absorption edge and a second filter constructed of a second element so that the filters exhibit essentially the same radiation absorption characteristics below the K-absorption edge of the first filter. The filters are adapted to be positioned so as to be irradiated by the radiation source so that the radiation impinges upon a surface of each filter and is partially absorbed as it passes therethrough so as to exit therefrom as attenuated radiation. A detector, such as X-ray film or a pair of photodiodes, is positioned for receiving the attenuated radiation passed by the first and second filters and provides an output indication when the radiation passed by the filters is differently attenuated. This is indicative that the known K-absorption edge of the first filter has been exceeded, thereby providing an indication as to the magnitude of the voltage applied to the radiation source.

13 Claims, 4 Drawing Sheets

APPARATUS FOR MEASURING THE PEAK VOLTAGE APPLIED TO A RADIATION SOURCE

FIELD OF THE INVENTION

This invention relates to the art of radiation measurement and, more particularly, to measuring the peak voltage applied to a radiation source, such as an X-ray generator, by monitoring the generated radiation.

BACKGROUND OF THE INVENTION

The calibration of an X-ray machine is important in diagnostic radiology. The measurement of the potential applied to an X-ray machine has been recognized as an important variable in the production of high quality diagnostic X-ray films. In the United States, the Radiation Control for Healthy and Safety Act of 1968 became law in 1973. The main intent of the law was to protect the population from unnecessary radiation exposure. One way to accomplish this is to reduce the number of retakes of X-rays. The law requires that X-ray machines meet certain requirements. One of these requirements is that the maximum applied input voltage, sometimes referred to as the peak kilovoltage (kVp), applied to the X-ray machine fall within certain limits specified by the manufacturer. If an X-ray machine is inaccurately calibrated, this may result in shortened component life and poor quality X-rays, which may result in retakes. Consequently, there is a need to periodically check the accuracy of the kVp setting on X-ray machines and recalibrate when required.

Diagnostic X-ray machines operate at relatively high voltages, such as on the order of 50 kV to 150 kV. Direct measurement of such a high voltage may be dangerous and has in the past been accomplished by disconnecting the high voltage circuits and reconnecting a high voltage divider having two large value resistance sections connected between the anode of the X-ray generator and ground and between the cathode of the generator and ground. The high voltage divider circuit is typically large in volume and size and the operation for measuring the high voltage in such apparatus is time-consuming and only qualified service personnel could accomplish this task. Hospital staff people have not normally been employed for conducting this test because of the size and weight of the divider circuit and the inherent danger involved in making such a measurement.

Alternatives to the direct measurement, utilizing a high voltage divider as discussed above, are various noninvasive measurement techniques presently being employed. This includes the use of a noninvasive film cassette, as well as a noninvasive electronic device employing filters and sensors. These noninvasive techniques measure the input voltage to an X-ray machine from measurements of the radiation the machine emits.

The film test cassettes (sometimes known as the Adrian Crooks or Wisconsin test cassette) have been used to determine the input kilovoltage to a radiation source from the measurements of the radiation it emits. A test cassette is placed in the field of an X-ray beam and operates on the principle that the extent of attenuation of an X-ray in a material, such as copper or aluminum, is related to the kilovoltage applied to the X-ray tube. X-ray film is exposed to X-rays that have been attenuated while passing through multiple layers of material including a copper sheet and a sheet that includes copper disks and holes. The measurement requires the assistance of skilled technicians, development of the film and reading of the film with a densitometer. The accuracy of this method is on the order of ±5 kV. Moreover, since such a test cassette can measure only the effective or average kV and not the true peak of the waveform, results will not reveal significant ripple or spiking on the waveform.

Another noninvasive device for measuring input voltage supplied to an X-ray machine takes the form of an instrument known in the art as a kVp meter. Examples of such meters are disclosed in various U.S. patents, including the patents to Zarnstorff et al., U.S. Pat. No. 4,697,280, Siedband, U.S. Pat. No. 4,361,900, as well as products manufactured by Keithley Instruments, Inc. as model Nos. 35070 and 35080. In general, these kVp meters operate on the principle of passing an X-ray beam through a pair of copper filters positioned side-by-side so that the X-ray beam is attenuated as it passes through each filter. The two filters are of different thicknesses and, hence, as the radiation passes through each filter, it is attenuated differently. The attenuated radiation from each filter is then detected by a pair of X-ray detectors, such as solid state photodiodes, which provide output electrical signals having magnitudes which depend upon the attenuated radiation levels from the two filters. A ratio of these two signals is then made. This ratio will vary with the input kilovoltage applied to the X-ray tube. The X-rays passing through the thicker material increase faster with increasing input kilovoltage than the X-rays passing through the thinner material. Consequently, the ratio of the signals representative of radiation passed through the thick material to that of the thin material starts at zero and increases as the kilovoltage increases. For very large kilovolts, the ratio approaches unity. These kVp meters typically operate over a range from 50 to 150 kV.

Recently, there has been significant interest dealing with mammography. This is the X-raying of the female breast to locate cancer at an early stage. Unlike a typical diagnostic X-ray machine, which operates in the range of 50 kV to 150 kV, the mammographic X-ray machines operate at a somewhat lower voltage level on the order of 25 kV to 40 kV. Another significant distinction is that the mammographic X-ray machines usually employ molybdenum anodes as opposed to the tungsten anodes which are use in diagnostic X-ray machines operating in the range of 50 kV to 150 kV. The use of molybdenum anodes for these lower voltage mammographic X-ray machines presents problems in attempting to measure the operating voltage with the typical kVp meters discussed hereinabove.

It has been determined that the photon spectrum for molybdenum in the mammographic region differs substantially from that of tungsten. Thus, in this region the photon spectrum for tungsten is a somewhat smooth inverted U-shaped curve, whereas that for molybdenum has a substantial discontinuity near the K edge of the anode material (approximately 20 kilovolts for molybdenum). Moreover, such a molybdenum anode will fluoresce at discrete energies on the order of 17.5 kV and 19.5 kV. Also, it is customary to employ additional filters made of molybdenum in a molybdenum X-ray machine which causes further suppression in the higher energy spectrum. As a consequence the ratio technique employed by the kVp meters, as discussed above, does not provide an adequately accurate measurement of the operating voltage of such mammographic X-ray machines.

The present invention is directed toward determining the operating voltage of an X-ray machine with an accuracy that is independent of the anode material. Thus, in the example given, the measurement is independent of whether the anode material is molybdenum or tungsten.

The present invention is based on the recognition that a chemical element, such as molybdenum or tungsten, exhibits an absorption phenomenon. Such elements when irradiated by an X-ray beam will absorb radiation at a predictable rate until the voltage applied to the X-ray machine attains a particular level and then a sudden transition takes place in the absorption rate. This transition is a sharp increase in the absorption rate and it corresponds with what is known as the K absorption edge of that particular chemical element. The K absorption edge refers to the K quantum shell. An electron can be removed from the K shell by photoelectric absorption. This takes place when photons of a sufficiently high energy level are incident upon an atom causing an electron to be ejected from the K shell. The threshold photon energy to achieve this is known as the K-absorption edge. Similar discontinuities are present in the L quantum shell as well as in the M quantum shell. However, elements have only a single sharp transition absorption edge in the K quantum shell. On the other hand, elements exhibit multiple absorption edges in the L quantum shell and in the M quantum shell. It would be difficult to determine from such multiple transitions the correct level of photon energy required to achieve the transitions. For this reason, it is believed that a more accurate determination of the photon energy level required can be made from sensing only the K absorption edge.

The patent to G. R. Harris et al., U.S. Pat. No. 3,766,383 discloses an apparatus for calibrating the kilovoltage of a diagnostic X-ray generator by placing a chemical element or test sample, having a known K-absorption edge, within an X-ray beam. The test sample is disposed at an angle of approximately 45 degrees to the generated radiation path so that some energy is reflected as scattered energy, and some energy is transmitted through the sample as transmitted energy. The scattered energy and the transmitted energy are detected and a ratio is calculated as to the transmitted and scattered detected radiation values. When this ratio changes significantly, it is indicative that the K-edge has been reached. Since the sample has a known K-absorption edge, this information is then used to determine the kilovoltage level.

The system proposed by Harris is awkward in its implementation. Because both the scattered as well as transmitted X-rays are detected, the detectors themselves must be positioned in different planes, one located in a plane above the test sample, and one located in a plane below the test sample. The structure to accomplish this would be relatively expensive and cumbersome in its implementation. In addition, the Harris system proposes the monitoring of the detector ratio as a function of the kilovolts applied, and this takes the form of an inverted V-shaped curve with an upsloping ramp which reaches a peak at the K-absorption edge of the test sample, and then a downward slope after the K-absorption edge has been exceeded. Consequently, the kilovoltage is a double valued function of the detector ratio. That is, there are two kilovolt levels for each detector ratio level, and, hence, for a single exposure or single reading, the operator would not know if the kilovoltage level at that ratio level is above or below the K-absorption edge.

SUMMARY OF THE INVENTION

It is an object of the present invention to provide an. apparatus for determining the peak voltage applied to a radiation source which apparatus operates independently of the anode material employed in generating the radiation.

It is a still further object of the present invention to provide an apparatus for measuring peak voltage applied to a radiation source which apparatus operates independently of the absorbing material which may be present in the X-ray path.

It is a still further object of the present invention to provide such an apparatus which does not rely on detecting scattered and transmitted radiation as proposed by Harris, supra.

In accordance with the present invention, apparatus is provided for measuring the peak voltage applied to a radiation source operating at a variable input voltage. This apparatus includes a set of radiation absorbing filters with the first filter constructed to include a first element that exhibits a known K-absorption edge, whereas the second filter is constructed of a second element or elements chosen so that the elements exhibit essentially the same radiation absorption characteristics for photon energies below the K-absorption edge of the first element. These filters are then positioned within the radiation emitted by the radiation source so as to be simultaneously irradiated by the source, the radiation impinging upon a surface of each element. This radiation is partially absorbed as it passed through the elements so as to exit therefrom as attenuated radiation. The attenuated radiation passed by the first and second filters is detected for purposes of providing an output indication when the radiation passed by the filters is differently attenuated. This indicates that the K-absorption edge of the first element has been exceeded and this is indicative of the magnitude of the voltage applied to the radiation source.

In accordance with another aspect of the present invention, a detector in the form of a radiation sensitive film is positioned such that the filters are located between the radiation source and the film. The film records two images having densities respectively representative of the total amount of the attenuated radiation passed by the first and second filters. The densities of the images will be the same unless the K-absorption edge of the first filter has been exceeded.

In accordance with a still further aspect of the present invention, the detector takes the form of a pair of radiation sensitive photoelectric means, such as photodiodes, positioned such that the first and second filters are located intermediate the radiation source and the photodiodes. These photodiodes will provide output electrical signals which will be of essentially the same magnitude until the K-absorption edge of the first filter has been exceeded whereupon one of the signals will be greater than the other. This difference in electrical signals may be observed as with a signal comparison means which may activate a visual output indicator, such as a light-emitting diode (LED), for providing a visual output indicative that the K-absorption edge of the first filter has been exceeded.

Still in accordance with the invention, a plurality of sets of radiation absorbing filter means are provided with each set including a first element and second element. The first elements include different chemical elements having different known K-absorption edges in the voltage range of interest. The second elements are chosen so that the elements exhibit the same radiation absorbing characteristics for photon energies below the K-absorption edge of the first element. The detector means may take the form of a radiation sensitive film or an array of photosensitive detector means, such as photodiodes, for providing output indications when the K-absorption edge of one or more of the sets has been exceeded.

BRIEF DESCRIPTION OF THE DRAWINGS

The foregoing objects and advantages of the invention will become more readily apparent from the following description of preferred embodiments of the invention as taken in conjunction with the accompanying drawings which are a part hereof and wherein.

DESCRIPTION OF PREFERRED EMBODIMENTS

Figure 1:
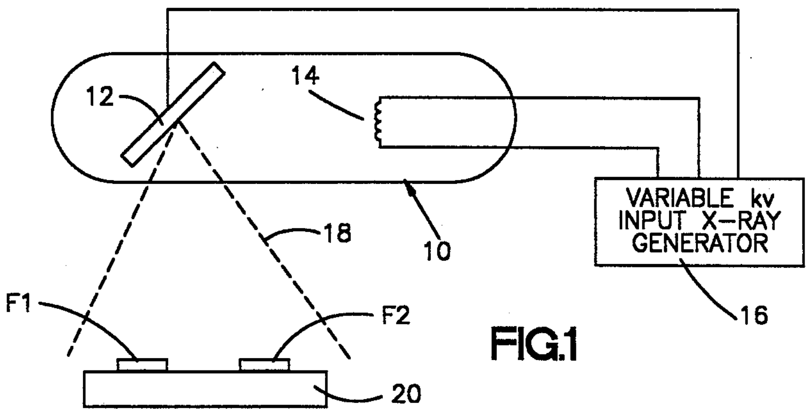
FIG. 1 is a schematic illustration showing one application of the invention for measuring the input voltage applied to an X-ray tube.

Referring now to FIG. 1, there is schematically illustrated an X-ray tube 10 having an anode 12 and a cathode 14. The anode 12 and the cathode 14 are connected to a variable kilovoltage X-ray generator 16 in a conventional fashion. The X-ray generator 16 is provided with means for supplying a variable kilovoltage to the X-ray tube over a range such as on the order from 10 kilovolts to 150 kilovolts. The intensity of the X-ray beam 18 generated by the X-ray tube varies with the setting of the variable kilovoltage supplied by the generator 16. The present invention is directed toward calibrating this input voltage by a noninvasive means for determining the peak kilovoltage applied by measuring characteristics of the X-ray beam 18.

In accordance with the invention, a pair of filters F1 and F2 are positioned within the field of energy of the X-ray beam 18. These filters F1 and F2 may be identical in size and shape, such as rectangular slabs or circular disks, and which preferably (for ease of design and construction) lie flat in the same plane so that radiation from the X-ray tube impinges upon a flat surface of each filter. Assume for the moment that each filter exhibits the same radiation absorbing characteristics. Radiation that passes through each filter will be attenuated by the same amount and a detector 20 monitoring the attenuated radiation exiting from each of the filters will note that the intensity of the attenuated radiation is equal. The detected attenuated radiation exiting from the two filters F1 and F2 may be converted into electrical signals of the same magnitude. The ratio of the two signals would be unity (or the difference would be zero). If the detectors are not of the same size or sensitivity, the ratio would be a constant but not equal to one.

The detector 20, for the purposes discussed thus far, may take the form of a film cassette including an X-ray film which will record two images for the attenuated radiation respectively passing through filters F1 and F2. The exposed film may be developed and the two exposed images may be examined with a film densitometer. So long as the attenuated radiation exiting from each filter is of the same intensity, the density of the two images will be the same. Alternatively, the detector 20 may include a photodiode associated with each filter for providing an electrical output signal indicative of the intensity of the detected radiation passed by the filter. Electrical circuitry may serve to provide an output in accordance with the ratio of the detected radiation passed by filter F1 to that of the detected radiation passed by filter F2. (Alternatively, the difference between the two may be taken.)

In accordance with the present invention, the radiation absorbing characteristics or the attenuation rate of filters F1 and F2 is identical up to an energy level that corresponds with a particular voltage $V_0$ which, in turn, is representative of a particular input kilovoltage applied to the X-ray tube. Until this level is reached, the difference or the ratio of the outputs from the filters will be the same. However, once this level has been exceeded, the difference between detected attenuated radiation from the filters will be greater than zero and the ratio will different than 1. This voltage level $V_0$ corresponds with the K-absorption edge of filter F2. The voltage range of interest may be from approximately 18 kV to 40 kV, suitable for mammographic X-rays. Within this range, the K-absorption edge for tin is 29.200 kV. On the other hand, the chemical element copper does not have a K-absorption edge within this range. Copper has a K-absorption edge at 8.979 kV. Since almost no energy will be transmitted through the filters at 8.979 kV, filter F2 may be constructed from chemical element tin, whereas filter F1 may be constructed from the chemical element copper.

The thicknesses of filters F1 and F2 are adjusted so that they have identical attenuation characteristics below the K edge of tin (filter F2). By so constructing filters F1 and F2, the outputs as detected by detector 20 will be equal until the input kilovoltage applied to the X-ray tube exceeds the K-absorption edge of tin (filter F2). At that point, the outputs will be different. If the detector 20 includes an X-ray film then, upon exposure, the image for filter F2 will not be as dense as that for filter F1, because of the sharp increase in attenuation at the K-absorption edge for tin (at 29.200 kV). Consequently, a single exposure would provide the operator with information as to whether the operating voltage applied to the X-ray tube is below or above that of the K-absorption edge of filter F2, in this case 29.200 kV for tin.

Figure 2:
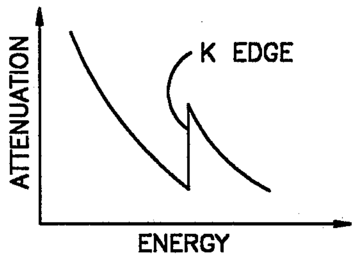
FIG. 2 is a waveform showing attenuation with respect to energy for purposes of illustrating the K-absorption edge of a chemical element.

The foregoing may be better appreciated with reference to FIG. 2, which shows a graphical illustration of attenuation versus energy when a chemical element is exposed to an X-ray beam, such as beam 18. As the photon energy increases, the attenuation decreases until the K-absorption edge for that chemical element is reached. At that point, there is a sudden increase in the attenuation, as is seen from FIG. 2. Consequently, if filters F1 and F2 exhibit the same attenuation characteristics until the photon energy exceeds the K edge of filter F2, the radiation exiting from the filters will be equal. Once the K edge has been exceeded, then the radiation exiting from filter F2 will be attenuated by a greater amount than that of the radiation exiting from filter F2. If this be recorded on an X-ray film, then the images for filter F2 will be less dense than that for filter F1. Thus, the present invention, in its broader aspects, provides a means for noninvasively determining from a single reading or exposure as to whether the input kilovoltage is above or below a particular level associated with the K-absorption of filter F2 (in this case 29.200 kV for tin).

The invention contemplates that an array of matched filter sets be employed, each including a filter F1 and a filter F2. A plurality of filters F2 may be used with each taking the form of a different chemical element having a K-absorption edge within the voltage range of interest (in this case from 15 kV to 40 kV). The corresponding plurality of filters F1 may each be of the same chemical element, such as copper and/or aluminum.

Figure 5:
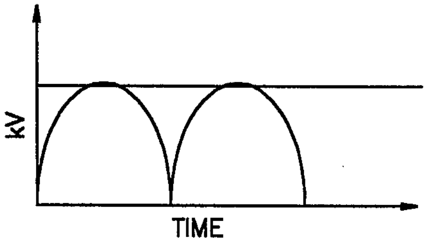
FIG. 5 is a view similar to that of FIG. 3, but showing the level of the operating voltage as exceeding the K-absorption edge.
Figure 3:
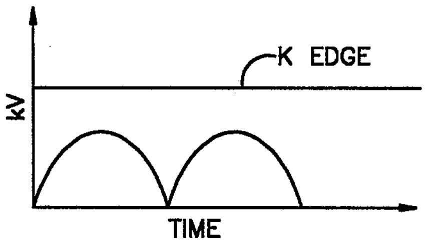
FIG. 3 is a waveform of voltage with respect to time illustrating the input voltage applied to an X-ray tube.
Figure 6:
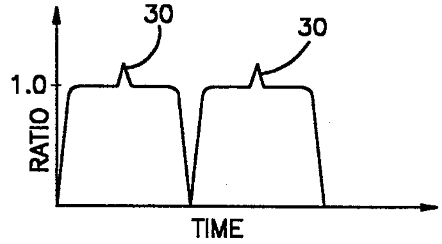
FIG. 6 is a waveform similar to that of FIG. 4, but showing spikes on the waveform indicative that the K-absorption edge has been exceeded.
Figure 4:
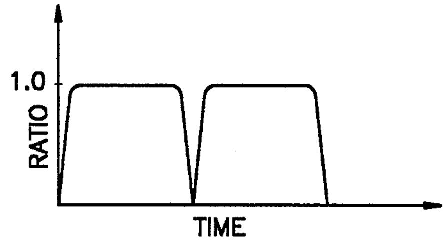
FIG. 4 is a waveform of ratio with respect to time showing that a squarewave results as long as the operating voltage is less than the K-absorption edge of the chemical element being employed.

Several matched filter sets, each including a copper and aluminum filter and a filter constructed of a chemical element having a K-absorption edge in the voltage range of interest have been tested using the Keithley Model 35080 kVp divider and an oscilloscope to provide a measurement of kilovoltage with respect to time and to provide an output representative of the ratio of the attenuated radiation passing through filter F1 to that passing through filter F2. In each case copper and aluminum elements were used for filters F1 and different chemical elements were used for filters F2. The experiments for filters F2 included silver (K-absorption edge of 25.514 kV), indium (K-edge of 27.940 kV), cadmium (K-edge of 26.711 kV) and tin (K-absorption edge of 29.200 kV). The operating voltage for a single phase X-ray generator appeared as shown in FIG. 3. The ratio with respect to time is shown in FIG. 4 and it is seen that a squarewave with a flat top is presented. The operating voltage was then increased, as is seen in FIG. 5, so that the peak voltage exceeds the K edge of filter F2. The result is a spike 30 on the ratio waveform of FIG. 6. The spikes 30 provide information that the K edge of filter F2 has been exceed and this provides an absolute calibration of the X-ray machine. In addition, the spike is roughly proportional to the amount by which the K-edge is exceeded and thus can be interpolated for further accuracy. The operation which ensues is independent of the anode material, i.e., for example, whether the anode material be tungsten or molybdenum. Table I below presents a listing of suitable chemical elements for filters F2 within the range from 15 kV to 40 kV.

TABLE I

| Element | K Edge |
|---|---|
| Molybdenum | 19.999 kV |
| Rhodium | 23.220 kV |
| Palladium | 24.350 kV |
| Silver | 25.514 kV |
| Cadmium | 26.711 kV |
| Indium | 27.940 kV |
| Tin | 29.200 kV |
| Antimony | 30.491 kV |
| Iodine | 33.169 kV |
| Cesium | 35.985 kV |
| Barium | 37.411 kV |

The elements presented in Table I all have K-absorption edges in the range between 15 kV and 40 kV. Consequently, all of these elements fall within the voltage range at which mammographic X-rays are taken. These elements may be employed for calibrating the peak kilovoltage applied to an X-ray tube used in mammography. The invention, however, can also be applied in the diagnostic region, which is on the order of from 50 kV to 150 kV. Some chemical elements which may be employed in the diagnostic region and their K-absorption edges are presented below in Table II.

TABLE II

| Element | K Edge |
|---|---|
| Gadolinium | 50.240 kV |
| Erbium | 57.486 kV |
| Tantalum | 67.414 kV |
| Tungsten | 69.524 kV |
| Platinum | 78.395 kV |
| Gold | 80.723 kV |
| Mercury | 83.103 kV |
| Lead | 88.006 kV |

Array of Matched Filter Sets

Figure 7:
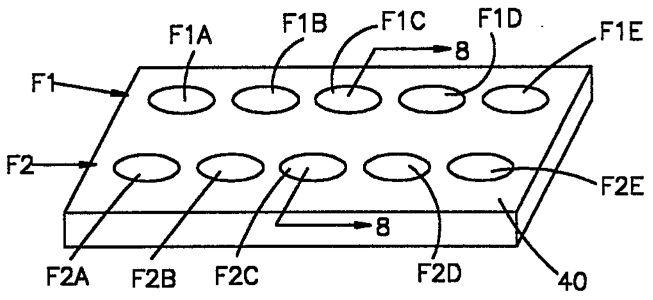
FIG. 7 illustrates an array of matched sets of filters mounted on a phantom in accordance with one embodiment of the invention.
Figure 8:
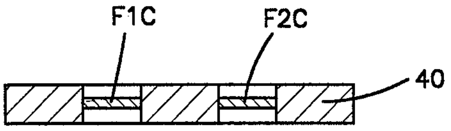
FIG. 8 is a view taken from FIG. 7 looking in the direction of the arrows 8—8.
Figure 9:
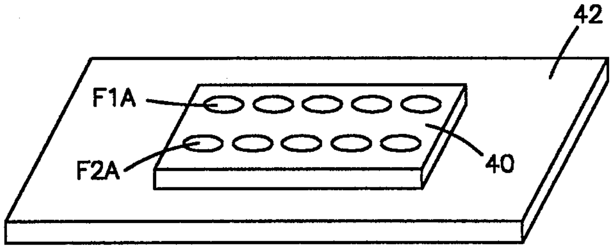
FIG. 9 is a perspective view illustrating the phantom of FIG. 7 placed on top of a film cassette.

Reference is now made to FIG. 7 which illustrate an embodiment of the invention employing an array of matched filter sets, each set including a pair of filters that correspond with filters F1 and F2 of FIG. 1. In this embodiment, however, each of the filters from the different sets that correspond with filter F1 may all be of the same chemical element. Thus, there are five F1 filters illustrated in FIG. 7 and are identified as filters F1A through F1E. Each of these filters may be constructed of a particular chemical element, such as copper or aluminum. On the other hand, the filters corresponding to filter F2 include filters F2A through F2E. Each of these filters is constructed from a different chemical element that does have a K-absorption edge within the range of interest. Preferably, these filters have K-absorption edges which are chosen to provide a sequence through the range of interest. For example, with reference to Table I, the elements to be employed for filters F2A through F2E may be of the following sequence: silver, cadmium, indium, tin and antimony. This, then, represents K-absorption edges of 25.514 kV, 26.711 kV, 27.940 kV, 29.200 kV and 30.491 kV for filters F2A through F2E, respectively. The filters may be mounted on a suitable holder or phantom 40, which may be constructed of a material which is essentially opaque to X-rays, such as steel or lead. This may be accomplished by providing a series of holes in the phantom and then mounting each filter in the manner as shown in FIG. 8 where filters F1C and F2C are illustrated as flat elements having an upper surface which may be exposed to X-rays impinging thereon from an X-ray machine. The elements may be held in place as with a suitable bonding or the like.

Figure 10:
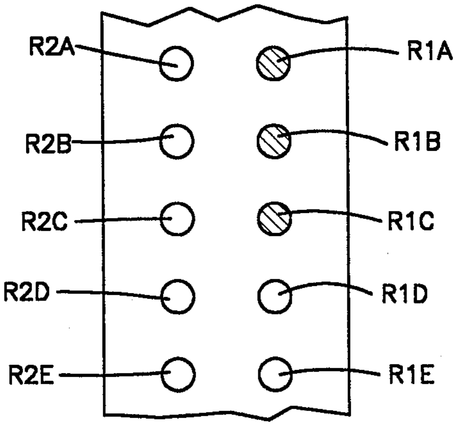
FIG. 10 is an illustration of the developed X-ray film taken from the film cassette of FIG. 9 and showing variations in intensity of recorded images.

In application, the phantom 40 (FIG. 7) may be placed on top of a film cassette 42 containing a sheet of X-ray film and an appropriate intensifying screen. The upper surface of phantom 40 is then exposed to an X-ray beam which irradiates each of the filter sets so as to expose the film to the radiation. The exposed film is then developed and the sets of exposed areas are examined with a film densitometer. The developed film 44 is illustrated in FIG. 10 which shows recorded images. These images correspond with the matched pairs of filters shown in FIG. 7. Thus, as seen in FIG. 10, recorded images R1A and R2A correspond with the matched set of filters F1a and F2A. Similarly, recorded images R1B and R2B correspond with filters F1B and F2B. In a similar manner, recorded images R1C, R2C and R1B, R2D, and R1E, R2E correspond to the other sets of matched filters in FIG. 7.

In the example shown in FIG. 10, the density levels are different for the recorded images R1A and R2A and are also different for the recorded images R1B and R2B, as is the same case with recorded images R1C and R2C. However, it will be noted that the densities are the same for recorded images R1D and R2D and R1E and R2E. This means that from a single exposure of an X-ray film to an X-ray beam, the operator knows that the peak kilovoltage was greater than that for the K-absorption edge level of filter F2C, but less than that of the K-absorption edge of filter F2D. Since the K-absorption edges for these filters are known from Table I, it can be concluded that the peak kilovoltage applied to the X-ray tube was between 27.940 kV and 29.200 kV and could be approximated by 28.57±0.63 kV. From a single exposure, then, the operator can determine the peak kilovoltage applied to the X-ray tube within 0.63 kV, in the example being given. This is a substantial improvement over prior art methods of determining peak kilovoltage which have an error factor on the order of ±1.5 kilovolts or more.

Figure 11:
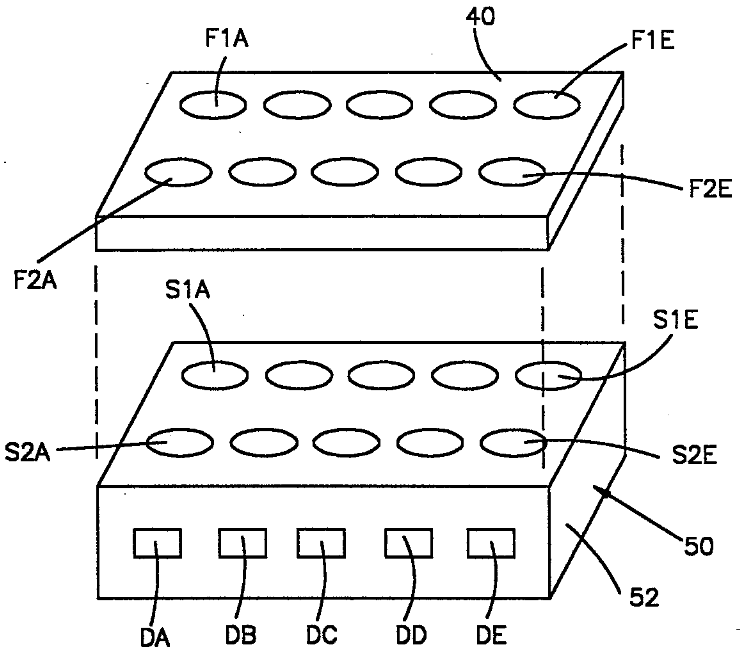
FIG. 11 illustrates another embodiment of the invention wherein the phantom of FIG. 7 is placed on top of a housing containing photodiode sensors and light-emitting diodes for indicating that the operating voltage has exceeded the K-absorption edge of one or more filters.
Figure 12:
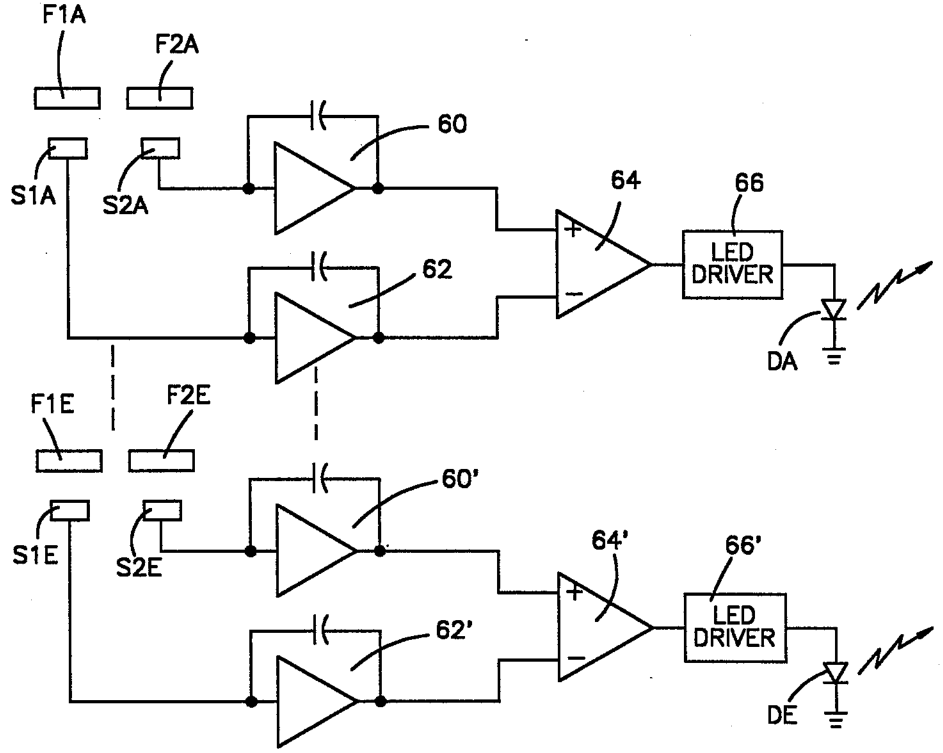
FIG. 12 illustrates the electronic circuitry employed within the housing of FIG. 11.

Attention is now directed to FIGS. 11 and 12 which illustrate an embodiment of the invention in which an photodiode array is substituted for the film 44 of FIG. 10. In the embodiment of FIG. 11, the phantom 40 may be constructed as described hereinbefore with reference to FIGS. 7 and 8. In this embodiment, the detector for detecting the peak kilovoltage may take the form of an electronic photodiode array 50, as opposed to the film 44 of FIG. 10. The array includes a housing 52 which contains sensors S1A through S1E aligned so as to be in registry with filters F1A through F1E when the phantom 40 is placed in registry on top of the array 50. Similarly, housing 52 contains sensors S2A through S2E which are aligned with filters F2A through F2E. Each sensor takes the form of a photodiode which is responsive to the radiation impinging thereon to provide an output current having a magnitude in accordance with the level of intensity of the received radiation. In addition to the radiation sensors, the housing 52 also contains electronic circuitry, to be discussed with reference to FIG. 12, for processing the signals and illuminating one or more visual indicator means, each taking the form of a light-emitting diode. These light-emitting diodes are illustrated as diodes DA through DE and are located on the front surface of the housing 52 so as to be easily viewed by an operator.

When an operator places the embodiment of FIG. 11 in a radiation beam, such as that illustrated in FIG. 1, all of the filters will be irradiated by the source. So long as the sensors for each matched set receives the same amount of radiation from their corresponding filters, then, none of the light-emitting diodes DA through DE will be energized. If there is a difference in the amount received by a matched set, then the light-emitting diode associated with that matched set will be energized, indicating that the peak kilovoltage (kVp) applied to the X-ray tube has exceeded the K-absorption edge associated with that matched set. For example, in a manner similar to that with respect to the film of FIG. 10, if the radiation level is sufficient that light-emitting diodes DA, DB and DC are all energized, but light-emitting diodes DD and DE are not energized, then the peak kilovoltage is 28.57±0.63 kV.

The circuitry employed for the embodiment of FIG. 11 is illustrated in FIG. 12. FIG. 12 illustrates the circuitry employed for the matched filter set F1A, F2A and for the matched filter set F1E and F2E. The circuitry for the remaining filter sets is the same.

Photodiode sensors S1A and S2A are located so as to receive radiation passing through the associated filters F1A and F2A. Each sensor provides an output current having a magnitude in depedence upon the intensity of radiation received. These output currents are supplied to integrating amplifiers 60 and 62, and the outputs thereof are supplied to a comparator 64. If the inputs to the comparator 64 differ from each other, then a driver circuit 66 is operative to energize the light-emitting diode DA. Energization of the light-emitting diode DA represents to the operator that the peak kilovoltage applied to the X-ray tube has exceeded the K-absorption edge of filter F2A. The circuit for matched filter set F1E, F2E is exactly the same and, consequently, like character references in FIG. 12 identify like components.

Figure 13:
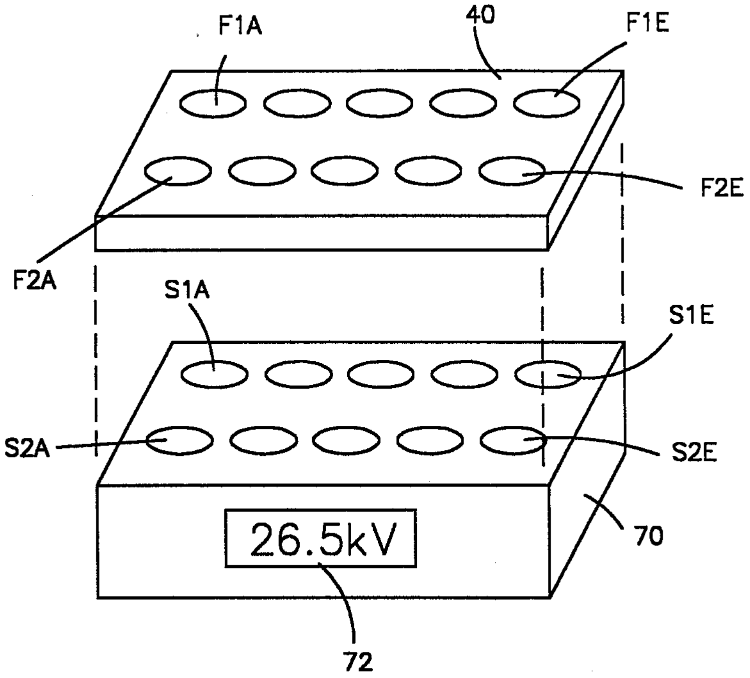
FIG. 13 is an embodiment similar to that of FIG. 11, but showing the phantom of FIG. 7 placed on top of a housing containing a digital read out display.
Figure 14:
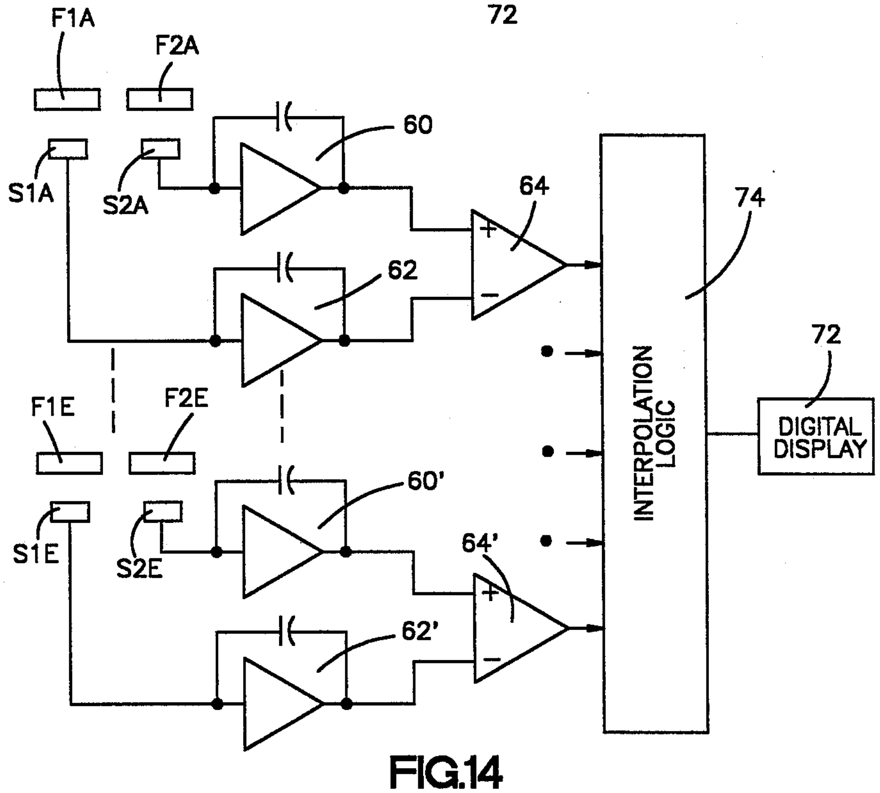
FIG. 14 illustrates the electronic circuitry employed within the housing of FIG. 13.

Reference is now made to FIGS. 13 and 14 which illustrate another embodiment of the invention and which is similar to that as illustrated in FIGS. 11 and 12 and, hence, similar components are identified with like character references. The phantom 40 in this embodiment is intended to be placed on top of a housing 70 containing sensors S1A through S1E and sensors S2A through S2E. These sensors are in registry and correspond with the filters F1A through F1E and F2A through F2E of phantom 40. This embodiment differs from that of FIGS. 11 and 12 in that housing 70 carries a digital display 72 together with electronic circuitry to energize the display. The electronic circuitry is shown in FIG. 14 and incorporates circuitry similar to that of FIG. 12, and like components are identified with like character references. The difference is in the use of an interpolation logic circuit 74 which operates to interpolate the outputs of the comparators 64, 64' to determine therefrom the peak kilovoltage detected and then activate the digital display 72. This circuitry takes advantage of the fact that the size of the signal mismatch is proportional to the amount by which the kV is above the K-edge.

It is to be noted that the electronic circuitry illustrated in FIGS. 12 and 14 show integrating or "averaging" amplifiers 60 and 62. These measure the effective kVp before the comparison is made with comparator 64. It is contemplated that these integrating or "averaging" circuits may be replaced with logarithmic amplifiers. This would allow the comparison of the logarithm of the signals which mathematically corresponds to the logarithm of the ratio of the signals. The ratio is independent of X-ray amplitude and this configuration would have advantages in practice.

Whereas the invention has been described with respect to various embodiments, it is to be appreciated that various changes may be made without departing from the spirit and scope of the invention as defined by the appended claims.

Having described preferred embodiments of the invention, the following is claimed:

1. Apparatus for measuring the peak voltage applied to an X-ray radiation source operating at an unknown input voltage comprising:

a set of radiation absorbing filters, the set including a first filter which includes at least a first chemical element that exhibits a known K-absorption edge and a second filter which includes at least a second chemical element;

said elements being chosen so that said filters exhibit essentially the same radiation absorption characteristics for photon energies below said known K-absorption edge of said first element, but substantially different characteristics above the known K-absorption edge;

said filters adapted to be positioned so that said first and second filters are irradiated by said radiation source with the radiation impinging upon a surface of each said filter and partially absorbed thereby as it passes therethrough so as to exit therefrom as attenuated radiation; and, detector means positioned for receiving the said attenuated radiation passed by said first and second filters and providing an output indication when the radiation passed by said filters is differently attenuated representative that the input voltage has exceeded the said known K-absorption edge of said first element and thereby providing an indication of the magnitude of said input voltage.

2. Apparatus as set forth in claim 1 wherein said detector means includes an X-radiation sensitive film for recording first and second images having densities respectively representative of the intensity of the attenuated radiation respectively passed by said first and second filters with different density values of said recorded images being representative that the K-absorption edge of said first element has been exceeded, thereby providing an indication of the magnitude of said input voltage.

3. Apparatus as set forth in claim 1 wherein said detector means includes first and second photosensitive means for respectively receiving the attenuated radiation passed by said first filter and said second filter for respectively providing first and second electrical signals each having a magnitude in accordance with the intensity of received radiation, and means for providing a said output indication when said first and second electrical signals differ from each other representative that the said known K-absorption edge of said first element has been exceeded and thereby providing an indication of the magnitude of the input voltage applied to said radiation source.

4. Apparatus as set forth in claim 3 including signal comparison means for comparing said first and second electrical signals for use in providing said output indication.

5. Apparatus as set forth in claim 4 including visual output indication means for providing a visual output indication when said first and second electrical signals differ from each other.

6. Apparatus as set forth in claim 5 wherein said visual output indication means includes a light-emitting diode responsive to said comparison means for providing said visual output indication.

7. Apparatus as set forth in claim 1 including an array of said sets of said radiation absorbing filters means, each set including a first filter constructed of a said first element and a said second filter constructed of a said second element, said first elements of the array including different chemical elements having different known K-absorption edges, said second elements being chosen so that the resulting filters exhibit essentially the same radiation absorption characteristics for photon energies below the K-absorption edge of the corresponding first elements, and said detector means including means for providing a said output indication when the radiation passed by the filters of at least one of said sets of filters is differently attenuated.

8. Apparatus as set forth in claim 7 wherein said detector means includes radiation sensitive film for recording first and second images for each said set of filters with each said first image and said second image corresponding with a first filter and a second filter of a particular set of said filters for thereby recording dot images having densities that vary with the intensity of the attenuated radiation respectively passed by said first and second filters of each said set.

9. Apparatus as set forth in claim 7 wherein said detector means includes a plurality of sets of first and second photosensitive means for respectively receiving the attenuated radiation passed by the said first filter and said second filter of one of said filter sets and providing first and second electrical signals in dependence upon the magnitude of the detected radiation therefrom and including means for providing a said output indication when the first and second electrical signals of a said set differ from each other thereby providing an indication that the known K-absorption edge of the first element of said set has been exceeded.

10. Apparatus as set forth in claim 9 including signal comparison means for each said set of photosensitive means for comparing said first and second electrical signals therefrom for providing said output indication.

11. Apparatus as set forth in claim 10 including visual output indication means for providing a visual output indicative that said K-absorption edge of said first element of said set has been exceeded.

12. Apparatus as set forth in claim 11 wherein said visual indicator means for each set includes a light-emitting diode responsive to said comparison means for providing a visual output indication.

13. Apparatus as set forth in claim 12 including interpolation logic means connected to a comparison means for each said set for determining therefrom the highest K-absorption edge which has been exceeded and by measuring the amount by which the signals differ to estimate the amount by which the K-absorption edge has been exceeded so as to thereby provide an output indication of the peak voltage applied to the radiation source, and digital display means coupled to said interpolation logic means for providing a digital output representative of the determined peak voltage.

* * * * *